United States Patent

Oshida et al.

[11] Patent Number: 5,552,047
[45] Date of Patent: Sep. 3, 1996

[54] HOLLOW FILAMENT BLOOD PROCESSING APPARATUS

[75] Inventors: Masatoshi Oshida; Hiromi Deguchi, both of Shizuoka, Japan

[73] Assignee: Terumo Kabushiki Kaisha, Tokyo, Japan

[21] Appl. No.: 445,500

[22] Filed: May 22, 1995

[30] Foreign Application Priority Data

May 24, 1994 [JP] Japan .................................. 6-135227

[51] Int. Cl.$^6$ ...................................................... B01D 3/00
[52] U.S. Cl. ........................ 210/321.8; 210/321.79; 210/321.88; 210/321.89; 210/450
[58] Field of Search ........................ 210/321.79, 321.8, 210/321.88, 321.89, 433.1, 330, 450

[56] References Cited

U.S. PATENT DOCUMENTS

| | | | |
|---|---|---|---|
| 4,277,338 | 7/1981 | Hoagland | 210/450 |
| 4,283,284 | 8/1981 | Schnell | 210/450 |
| 4,283,289 | 8/1981 | Meyst et al. | 210/450 |
| 4,594,161 | 6/1986 | Goto | 210/450 |
| 4,689,149 | 8/1987 | Kanno et al. | 210/450 |
| 5,139,669 | 8/1992 | Clermont et al. | 210/321.8 |
| 5,160,615 | 11/1992 | Takagi et al. | 210/321.8 |
| 5,236,586 | 8/1993 | Antony et al. | 210/321.8 |
| 5,277,807 | 1/1994 | Lavoie et al. | 210/321.74 |

*Primary Examiner*—Ana Fortuna
*Attorney, Agent, or Firm*—Burns, Doane, Swecker & Mathis, LLP

[57] ABSTRACT

A hollow filament type blood processing apparatus, typically dialyzer includes a bundle of multiple hollow filaments (3) for processing blood inserted in a housing (2). Inlet and outlet ports (12, 11) are disposed in the housing near its opposite ends for passing a dialysis fluid through the housing. The filament bundle is fixedly secured to the housing at its opposite ends by partitions (5, 6). Caps (9, 10) are fixedly attached to the opposite ends of the housing and each have a port for passing blood from one port (8) to the other port (7) through the hollow filaments. Each cap has received therein inside and outside elastomeric rings (17a, 17b). The inside elastomeric ring (17a) is interposed under pressure between the cap (9) and the partition (5). The outside elastomeric ring (17b) is interposed under pressure between the cap (9) and the housing (2). No blood leakage occurs between the caps and the housing.

3 Claims, 3 Drawing Sheets 5,552,047

HOLLOW FILAMENT BLOOD PROCESSING APPARATUS

FIELD OF THE INVENTION

This invention relates to a hollow filament type blood processing apparatus, especially for use as hollow filament type artificial dialyzers, artificial lungs, and plasma separators.

BACKGROUND OF THE INVENTION

A number of hollow filament type liquid processing apparatus are known in the art. One typical example is hollow filament type artificial dialyzers. They are generally constructed by inserting a bundle of multiple hollow membrane filaments for dialysis into a cylindrical housing having inlet and outlet ports for dialysis fluid. The hollow filament bundle at opposite ends is liquid-tightly secured to the housing at opposite ends by means of partitions which are formed of a potting agent. Caps having inlet and outlet ports for blood are attached to the housing ends. Synthetic membranes of cellulose acetate and polysulfone or regenerated cellulose membranes of cuprammonium cellulose are often used as the hollow membrane filaments for dialysis. Polyurethane is a typical potting agent.

In such hollow filament type artificial dialyzers, the cap is typically a funnel-shaped member having an attachment portion, a shoulder and a beak-like portion defining a blood inlet or outlet port. The shoulder is provided in the inner surface with an annular recess in which an O-ring of silicone rubber or the like is received. The attachment portion of the cap is secured to the housing either directly by ultrasonic fusion welding or by fastening another member such as a threaded ring.

After the bundle including a multiplicity of hollow filaments is inserted into the housing, a dispersing operation is usually carried out as by air spraying such that the filaments are substantially uniformly distributed within the bundle and the bundle has a predetermined outer diameter. However, since hollow filaments themselves are very thin, some filaments near the periphery of the bundle can be located outside the predetermined outer diameter. In conventional blood dialyzers wherein each blood port-defining cap is secured to the housing such that the O-ring mounted in the annular recess in the cap shoulder is urged under pressure against the partition, a liquid-tight seal between the O-ring and the partition will fail if some hollow filaments or fine foreign particles are present in the contact area between the O-ring and the partition. Then during operation after sterilization, blood will leak between the O-ring and the partition, leaving a risk of blood leakage between the cap and the housing.

SUMMARY OF THE INVENTION

Therefore, an object of the present invention is to provide a hollow filament type blood processing apparatus of the above-mentioned structure which can prevent any blood leakage between the cap and the housing after sterilization even when some improperly located hollow filaments or fine foreign particles are present in the contact area between the O-ring and the partition.

According to the present invention, there is provided a hollow filament type blood processing apparatus comprising a housing having opposite open ends. A bundle of multiple hollow filaments for processing blood is inserted into the housing. Inlet and outlet ports are disposed in the housing near the opposite ends for passing a blood-processing fluid through the housing. The hollow filament bundle at its opposite ends is fixedly secured to the housing at its opposite ends by partitions. Caps are fixedly attached to the opposite ends of the housing so as to face the partitions and each have a port for passing blood from one port to the other port through the hollow filaments. Each cap has received therein an inside elastomeric ring and an outside elastomeric ring. The inside elastomeric ring is interposed under pressure between the cap and the corresponding partition. The outside elastomeric ring is interposed under pressure between the cap and the housing.

In one preferred embodiment, the cap is provided in a peripheral inner surface with an annular recess in which the inside elastomeric ring is received or anchored.

Often, the inside and outside elastomeric rings are connected by an annular bridge. Preferably the inside elastomeric ring, the annular bridge and the outside elastomeric ring are integrally molded into an annular gasket. More preferably, the inside elastomeric ring has a root portion received in an annular recess in the inner surface of the cap and a seal portion in contact with the partition, and the outside elastomeric ring has a base portion in contact with the inner surface of the cap and a seal portion in contact with the end face of the housing. Typically the inside ring, bridge, and outside ring defines an annular space with the partition. The elastomeric rings or the gasket may be integrally molded with the cap by a two color molding technique.

In another preferred embodiment, the partition has a peripheral portion where no hollow filaments are located and the inside elastomeric ring is in contact with the filament-free peripheral portion of the partition.

Most often, the hollow filament type blood processing apparatus of the invention is used as a blood dialyzer.

ADVANTAGES

In the hollow filament type blood processing apparatus, the caps are secured to the housing with the inside elastomeric ring being interposed under pressure between the cap and the corresponding partition and the outside elastomeric ring being interposed under pressure between the cap and the housing. This double ring gasket prevents any blood leakage between the caps and the housing even when some improperly located hollow filaments or fine foreign particles are present in the contact area between the inside elastomeric ring and the partition, because the outside elastomeric ring is kept in sealing contact with the end face of the housing. The blood processing apparatus is naturally subject to sterilization after its assembly. Since sterilization is often done by heating, the material of the partitions can undergo certain reaction and hence shrinkage. Despite the general design that the inside elastomeric ring is interposed under pressure between the cap and the partition in expectation of such shrinkage, a liquid-tight seal between the inside elastomeric ring and the partition will fail if shrinkage of the partition material occurs beyond the expectation. Even in such an event, blood leakage between the caps and the housing is prohibited because the outside elastomeric ring is kept in sealing contact with the end face of the housing.

BRIEF DESCRIPTION OF THE DRAWINGS

These and other objects, features and advantages of the invention will be better understood by reading the following description taken in conjunction with the drawings.

BEST MODE FOR CARRYING OUT THE INVENTION

Figure 1:
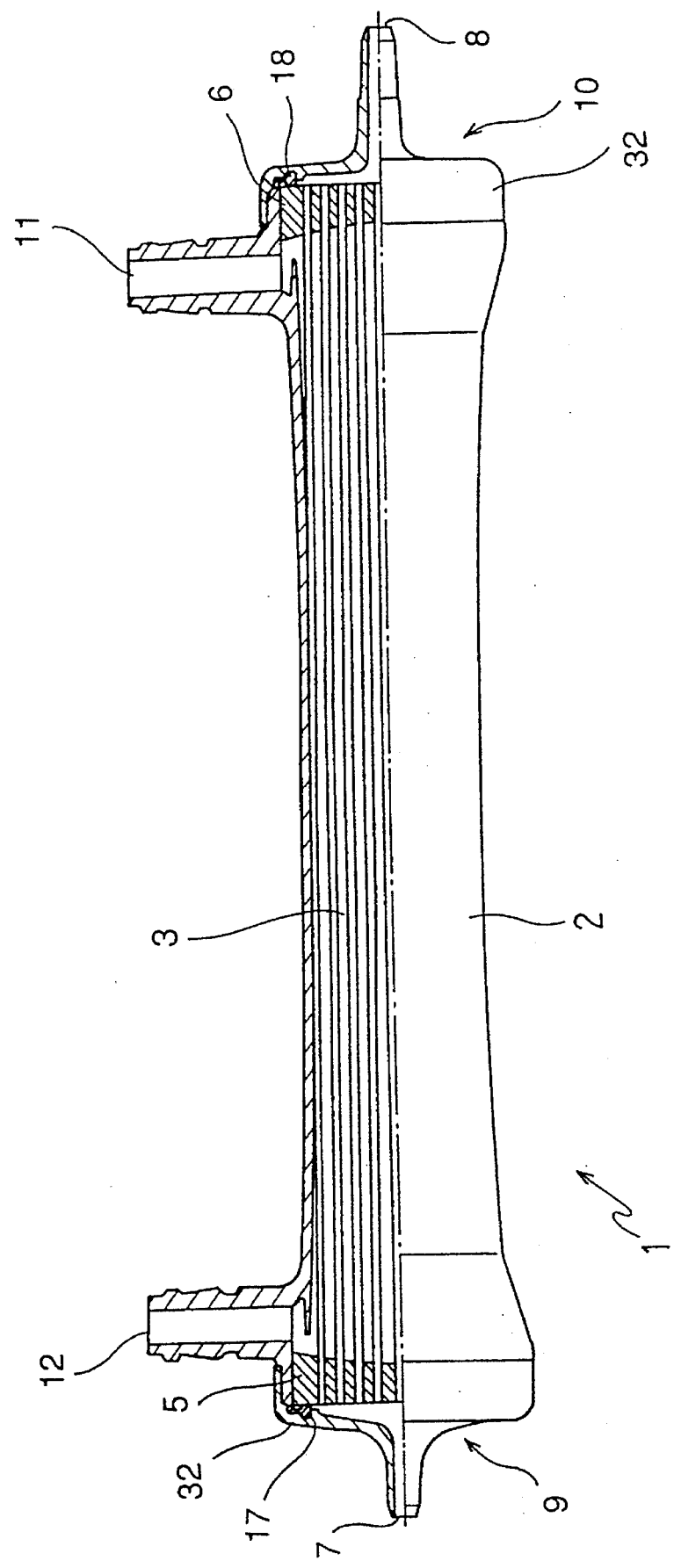
FIG. 1 is a partially cross-sectional view of a hollow membrane type blood processing apparatus according to one embodiment of the invention.

Referring to FIG. 1, a hollow membrane filament type blood processing apparatus generally designated at 1 is illustrated as comprising a cylindrical housing 2 having opposed open ends. A bundle including a multiplicity of hollow membrane filaments 3 for processing blood is inserted into the housing 2. An outlet port 11 and an inlet port 12 are disposed in the housing 2 near its opposed open ends for passing a blood-processing fluid through the housing. The hollow membrane bundle at opposed ends is fixedly secured to the opposed ends of the housing by partitions 5 and 6. An outlet cap 9 having a blood outlet port 7 is attached to the one end of the housing where the one partition 5 is located. An inlet cap 10 having a blood inlet port 8 is attached to the other end of the housing where the other partition 6 is located. The outlet and inlet caps 9 and 10 are fixedly secured to the housing 2 with each of annular elastomeric gaskets 17 and 18 interposed therebetween to establish double fluid-tight seals.

Figure 2:
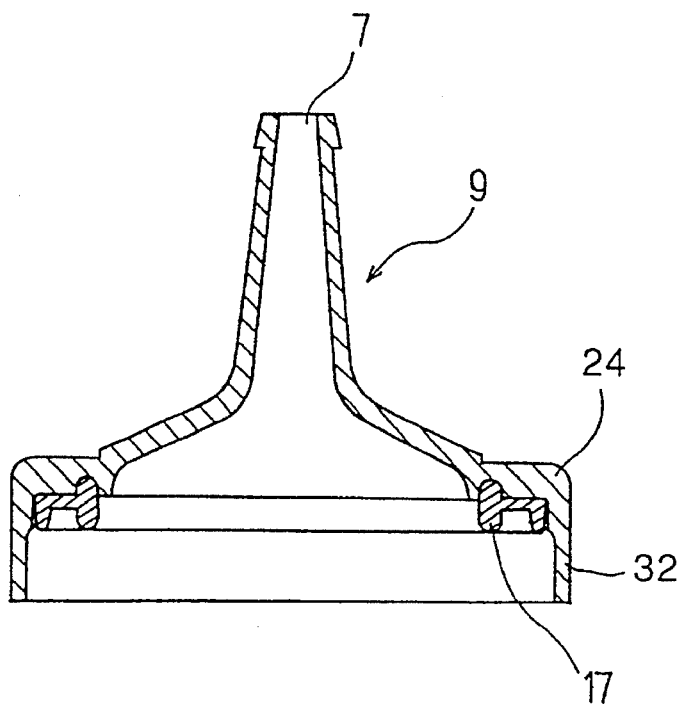
FIG. 2 is an enlarged cross-sectional view of the cap of the apparatus of FIG. 1 having an elastomeric gasket mounted therein.
Figure 3:
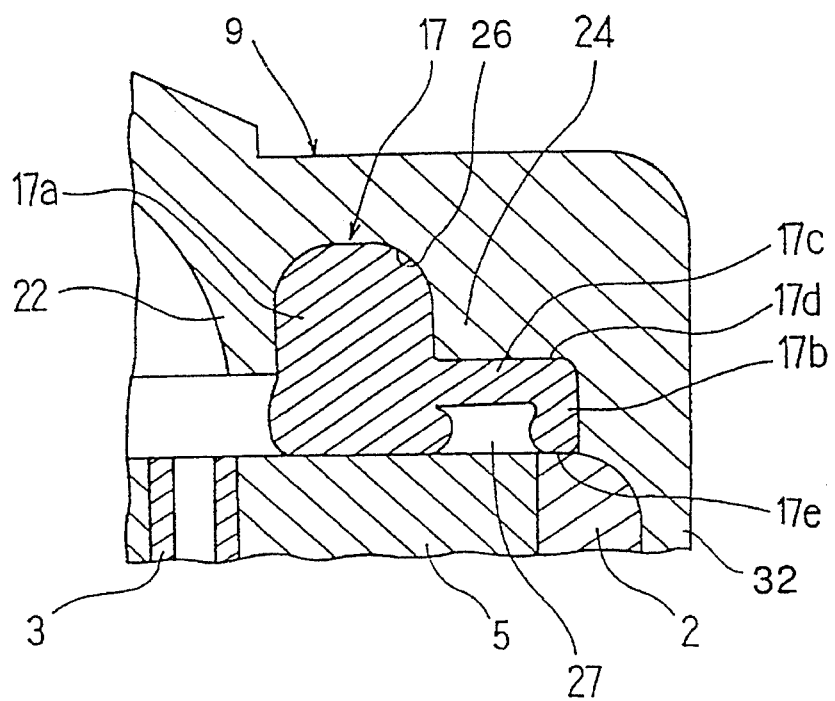
FIG. 3 is an enlarged cross-sectional view of a portion of the cap shown in FIG. 2 with the cap having the elastomeric gasket mounted therein being attached to the housing.

Since the outlet and inlet caps 9, 10 as well as the partitions 5, 6 and gaskets 17, 18 are of the same construction, only the outlet cap 9, partition 5 and gasket 17 at one side are described hereinafter. FIG. 2 is an enlarged cross section of the cap 9. FIG. 3 is an enlarged cross section of a shoulder portion of the cap 9. It is seen that the annular gasket 17 is located inside the shoulder of the cap 9.

As shown in FIG. 3, the annular gasket 17 includes a radially inside elastomeric ring 17a and a radially outside elastomeric ring 17b. The cap 9 is secured to the housing 2 with the inside ring 17a interposed between the inner surface of the cap 9 and the partition 5 and the outside ring 17b interposed between the inner surface of the cap 9 and the end surface of the housing 2 both under pressure.

The apparatus or housing has a centerline axis extending between the inlet and outlet ports 8 and 7 in the illustrated embodiment. The terms "axial" and "radial" are used to indicate directions parallel and transverse to this axis, respectively, throughout the specification.

The respective components of the hollow membrane type blood processing apparatus are described in more detail.

The housing 2 is configured tubular, preferably cylindrical. Received in the housing 2 are about 5,000 to 50,000 hollow membrane filaments 3 for dialysis which axially extend throughout the housing interior. The hollow filaments 3 each define a lumen and has opposed open ends which are liquid-tightly secured to the ends of the housing 2 by means of the partitions 5 and 6, with the opening of the filaments left unblocked. Then the interior of the housing 2 is partitioned into two chambers, a dialysis fluid chamber defined by the outer surface of the hollow filaments 3, the inner wall of the housing 2 and the partitions 5 and 6 and a blood chamber defined inside the hollow filaments 3 as a collection of their lumens.

The tubular housing 2 may be formed of a suitable resin such as polycarbonate, acrylonitrile-styrene copolymer, polystyrene, and butadiene-styrene copolymer. The tubular housing 2 is provided with the dialysis fluid outlet 11 in the side wall near one end and the dialysis fluid inlet 12 in the side wall near the other end.

The hollow membrane filaments 3 for dialysis are formed of regenerated celluloses such as cellulose acetate and cuprammonium cellulose, cellulose derivatives, ethylene-vinyl alcohol copolymers and acrylonitrile copolymers. They generally have a membrane thickness of about 5 μm to about 35 μm, preferably about 10 μm to about 20 μm and an outer diameter of about 50 μm to about 500 μm, preferably about 100 μm to about 300 μm, with the lumen extending throughout their length.

The partition 5 (or 6) is formed of a potting agent such as polyurethane and silicone rubber. It is generally of a disk shape. The partition preferably has a peripheral portion free of hollow filaments so that the annular gasket 17 (or 18) may contact with the hollow filament-free peripheral portion of the partition 5. If the gasket 17 is in contact with the partition 5 where hollow filaments open, those filaments are closed with the gasket, failing to achieve effective utilization of all the hollow filaments 3 received in the housing 2. Also if the gasket 17 is in contact with the partition 5 where hollow filaments open, blood can leak between the contact surfaces. It is understood that the hollow filament blood processing apparatus of the invention always prevents any leakage of blood from between the cap 9 (or 10) and the housing 2 since the outside ring 17b is kept in sealing contact with the end face of the housing 2.

The caps 9 and 10 are attached to the opposite ends of the housing 2. More particularly, as shown in FIG. 2, the cap 9 is a funnel-like one-piece member including an attachment portion 32 including a cylindrical portion and a shoulder, a convergent or transition portion, and a beak-like portion defining the port 7. The attachment portion 32 of the cap 9 is fixedly secured to the housing 2 by RF or ultrasonic fusion welding.

The cap 9 (or 10) is formed of a suitable thermoplastic resin, for example, polyolefins such as polypropylene and polyethylene, polycarbonate, acrylonitrile-styrene copolymers, butadiene-styrene copolymers, and polystyrene. The annular elastomeric gasket 17 (or 18) is preferably formed of silicone rubber, polyurethene, isoprene rubber, vulcanized rubber, butadiene rubber, ethylene-propylene rubber, polyolefin elastomers, and styrene elastomers (e.g., styrene-butadiene-styrene block copolymers).

The hollow filament type blood processing apparatus 1 includes the annular elastomeric gasket 17 (or 18) for providing a light-tight seal between the housing 2 and the cap 9 (or 10).

The annular elastomeric gasket 17 includes a radially inside elastomeric ring 17a and a radially outside elastomeric ring 17b as best shown in FIG. 3. The cap 9 is secured to the housing 2 with the inside gasket 17a interposed between the inner surface of the cap 9 and the outer surface of the partition 5 and the outside gasket 17b interposed between the inner surface of the cap 9 and the end surface of the housing 2 both under pressure. When the cap 9 is secured to the housing 2, not only the inside gasket 17a is interposed under pressure between the cap 9 and the partition 5, but also the outside gasket 17b is interposed under pressure between the cap 9 and the housing 2. Then even when some hollow filaments or fine foreign particles are located in the contact area between the partition 5 and the inside elastomeric ring 17a, the hollow filament type blood processing apparatus 1 prohibits any leakage of blood between the cap 9 and the housing 2 after sterilization since the outside elastomeric ring 17b is in sealing contact with the housing 2.

The attachment of the cap to the housing is described in more detail. The shoulder 24 of the cap 9 has an annular recess 26 in the inner surface. Differently stated, the cap 9 is provided with an axially inwardly extending annular rib 22 so that an annular recess 26 is defined by the outside surface of the annular rib 22 and the inside and bottom surfaces of the shoulder 24 as shown in FIG. 3. The inside elastomeric ring 17a is generally of ellipsoidal shape including a root portion and a seal portion connected together. The annular gasket 17 is mounted to the cap 9 by fitting the root portion of the inside elastomeric ring 17a in the annular recess 26. Provision of the annular recess 26 in the inner surface of the shoulder of the cap 9 allows for easy attachment of the annular gasket 17 and prevents any displacement of the gasket 17 after attachment.

After attachment, the seal portion of the inside elastomeric ring 17a projecting from the recess 26 is in pressure contact with the outer surface of the partition 5, maintaining a liquid tight seal. The cross-sectional shape of the inside elastomeric ring 17a is not limited to the ellipsoidal shape shown in FIG. 3 and it may have any desired shape including rectangular, semi-circular, triangular and trapezoidal shapes. The seal portion may be wider than the root portion of the inside elastomeric ring 17a, if desired. The seal portion may be divided into two or more portions, for example, two or more annular skirts, achieving more effective prevention of blood leakage.

The annular gasket 17 has the outside elastomeric ring 17b disposed radially outside the inside elastomeric ring 17a. The outside elastomeric ring 17b has a base portion 17d in close contact with the inner surface of the shoulder 24 of the cap 9 and a seal portion 17e in sealing contact with the end face of the housing 2. As mentioned above, the cap 9 is secured to the housing 2 with the outside elastomeric ring 17b interposed under pressure between the inner surface of the cap 9 and the end face of the housing 2. Then even when some hollow filaments or fine foreign particles are located in the contact area between the surface of the partition 5 and the inside elastomeric ring 17a or when some hollow filaments are located in an annular space 27 to be described later, any leakage of blood between the cap 9 and the housing 2 is prohibited since the outside elastomeric ring 17b at its seal portion 17e is in sealing contact with the end face of the housing 2, but not with the surface of the partition 5.

The seal portion 17e of the outside elastomeric ring 17b is preferably tapered or rounded toward its tip, that is, toward the opposing end face of the housing 2. This facilitates elastic deformation of the seal portion 17e, ensuring a more tight seal when it is clamped in place under pressure.

The inside and outside elastomeric rings 17a and 17b are configured in axial length such that the respective seal portions at their end may be substantially coextensive in a common plane. This ensures more stable attachment of the cap 9 to the housing 2. It is, however, noted that the seal portion of the outside elastomeric ring 17b may axially extend beyond the seal portion of the inside elastomeric ring 17a. This leads to more effective prevention of blood leakage since the outside elastomeric ring 17b is more tightly compressed than the inside elastomeric ring 17a upon attachment of the cap 9 to the housing 2.

Figure 4:
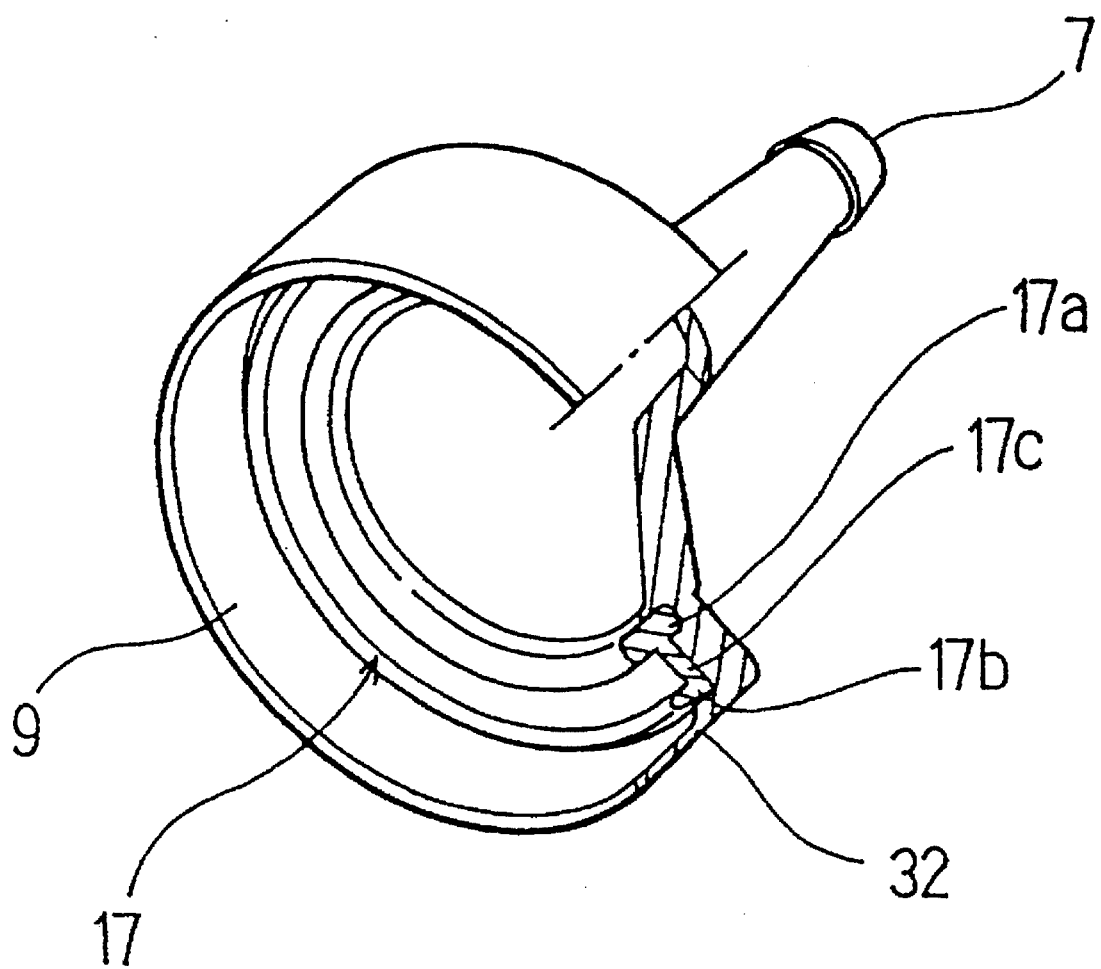
FIG. 4 is a partially cut-away perspective view of the cap shown in FIG. 2.

In the embodiment shown in FIGS. 2 to 4, the annular elastomeric gasket 17 includes an annular bridge 17c connecting the inside and outside elastomeric rings 17a and 17b. More particularly, the bridge 17c radially extends between the outside surface of the inside elastomeric ring 17a and the inside surface of the outside elastomeric ring 17b while it makes a turn in a circumferential direction. An annular space 27 is defined by the gasket 17 (17a, 17c, 17b) and the partition 5. In this way the inside and outside elastomeric rings 17a and 17b are connected by the bridge 17c to form a one-piece annular elastomeric gasket 17, which is more easy to mount to the cap 9. Since the bridge 17c connecting the inside and outside elastomeric rings 17a and 17b is annular, blood that has leaked through the contact area between the inside elastomeric ring 17a and the surface of the partition 5 is prevented from leaking through the contact area between the inner surface of the cap 9 and the outside elastomeric ring 17b. Even when some hollow filaments are located in the annular space 27, blood flowing into the space 27 does not leak outside as long as the bridge 17c is annular, that is, the space 27 is closed. The bridge 17c is not limited to an annular one, and it may partially connect the inside and outside elastomeric rings 17a and 17b.

The annular bridge 17c has an outer surface in contact with the inner surface of the cap 9 and an inner surface defining the annular space 27 with the outside surface of the inside ring 17a and the inside surface of the outside ring 17b. The annular space 27 thus defined allows the inside and outside rings 17a and 17b, when they undergo elastic deformation by pressure clamping, to escape toward the space 27, which facilitates deformation of ring elastomers, ensuring a more stable seal between the cap 9 and the partition 5 or the housing 2.

The cap 9 and annular elastomeric gasket 17 are described in more detail. The inside elastomeric ring 17a of the gasket 17 is a main seal member for establishing a liquid-tight seal between the cap and the partition and the outside elastomeric ring 17b is intended to provide a subordinate seal which becomes effective upon failure of the liquid-tight seal of the inside ring 17a. The inside ring 17a has a larger volume and hence a greater quantity of elastic deformation than the outside ring 17b. The inside ring 17a preferably has a width (in a radial direction) of about 0.5 mm to about 5.0 mm, more preferably about 2 mm to about 3 mm. Preferably the inside ring 17a protrudes from the inner surface of the cap 9 an axial distance of about 0.5 mm to about 2.5 mm, more preferably about 1.0 mm to about 2.0 mm when it is free and an axial distance of about 0.5 mm to about 1.2 mm, more preferably about 0.5 mm to about 1.0 mm when it is clamped under pressure. The inside ring 17a has an outer diameter which depends on the size of the housing 2. Preferably the outer diameter of the inside ring 17a is about 1.0 mm to about 5.0 mm, especially about 1.5 mm to about 3.5 mm smaller than the inside diameter of the housing 2.

The outside elastomeric ring 17b has an inner diameter which is approximately equal to or slightly larger than the inner diameter of the housing 2 and an outer diameter which is smaller than the outer diameter of the housing 2. The outside ring 17b, especially its seal portion 17e has a (radial) width which is smaller than the wall thickness of the housing 2. Preferably, the inner diameter of the outside ring 17b is 0 to about 2.0 mm, more preferably about 0.5 mm to about 1.5 mm larger than the outer diameter of the inside ring 17a. Preferably the outside ring 17b is concentric with the inside ring 17a although the distance therebetween may partially vary. The length of the outside ring 17b (that is, the distance that the ring 17b axially extends from the inner surface of the cap 9) is preferably about 0.5 mm to about 2.5 mm, especially about 1.0 mm to about 2.0 mm when it is free and about 0.5 mm to about 1.2 mm, especially about 0.5 mm to about 1.0 mm when it is clamped under pressure.

The annular bridge 17c preferably has a thickness (in an axial direction) of about 0.2 mm to about 1.0 mm, especially about 0.3 mm to about 0.7 mm. With the cap 9 attached to the housing 2, the distance between the bridge 17c and the partition 5 is preferably 0 to about 0.8 mm, especially 0 to about 0.5 mm. The annular bridge 17 has an inner diameter which is equal to the outer diameter of the inside ring 17a and an outer diameter which is equal to the inner diameter of the outside ring 17b.

As mentioned above, the caps 9 and 10 are secured to the housing 2 in a liquid-tight manner. As a result, blood outlet and inlet chambers are defined between the inner surface of the caps 9 and 10 and outer surface of the partitions 5 and 6, respectively.

It is noted that although the annular gasket 17 is molded separately from the cap 9 and mounted inside the cap 9 in the illustrated embodiment, they may be integrally molded from the first. Integral molding of the gasket 17 and the cap 9 means integration therebetween which is more effective for preventing blood leakage.

Useful for integral molding is a technique of first injection molding a cap and immediately thereafter injection molding an annular gasket inside the cap, which is known as a two color injection molding technique. Also useful is an insert molding technique involving the steps of injection molding an annular gasket, placing the molded gasket in a cap-shaped mold cavity, and injecting a resin compound into the cavity to mold a cap.

Where a two color molding technique is used in molding the annular gasket 17, materials which are compatible or bondable to each other are selected for the gasket 17 and the cap 9. For example, where the cap 9 is formed of a polyolefin, a polyolefin elastomer is preferably selected for the gasket 17. Insofar as the annular recess 26 is properly configured so as to provide physical anchoring, elastomeric materials which are not bondable to the cap material, for example, silicone rubber, polyurethane rubber and vulcanized rubber may be used. Where an insert molding technique is used, elastomers such as isoprene rubber, ethylenepropylene rubber and silicone rubber may be used for the gasket.

The hollow filament type dialyzer 1 is sterilized before use. For sterilization purpose, well-known techniques such as ethylene oxide gas sterilization and autoclave sterilization may be used. More particularly, the dialyzer interior (both the dialysis fluid and blood chambers) is filled with a biologically safe liquid (e.g., physiological saline and aseptic water) and openings (including the dialysis fluid inlet and outlet and blood inlet and outlet) are closed with elastomeric plugs before autoclave sterilization is effected. Since autoclave sterilization entails heating to about 120° C., there is a possibility that materials used in the partitions and the like undergo certain reaction and hence shrinkage. According to a common practice taken in expectation of such shrinkage, the inside ring 17a made of a less contractible elastomeric material is interposed under pressure between the cap 9 and the partition 5. Even if the partition material shrinks beyond expectation, blood leakage between the cap 9 and the housing 2 is prohibited since the outside ring 17b is in contact with the end face of the housing 2.

Although the invention is described as an artificial dialyzer in the illustrated embodiment, the blood processing apparatus of the invention is equally applicable to artificial lungs, plasma separators and the like.

According to the present invention, there is provided a hollow filament type blood processing apparatus comprising a housing having opposite open ends, a bundle of multiple hollow filaments for processing blood received in the housing, inlet and outlet ports disposed in the housing near the opposite ends for passing a blood-processing fluid through the housing, the hollow filament bundle at its opposite ends being fixedly secured to the housing at its opposite ends by partitions, and caps fixedly attached to the opposite ends of the housing so as to face the partitions and each have a port for passing blood from one port to the other port through the hollow filaments. Each cap has mounted therein an inside elastomeric ring and an outside elastomeric ring, the inside elastomeric ring is interposed under pressure between the cap and the corresponding partition, and the outside elastomeric ring is interposed under pressure between the cap and the housing. The double ring gasket prevents any blood leakage between the caps and the housing after sterilization even when some improperly located hollow filaments or fine foreign particles are present in the contact area between the inside elastomeric ring and the partition, because the outside elastomeric ring is kept in sealing contact with the end face of the housing. Since the blood processing apparatus is naturally subject to sterilization by heating after its assembly, the partition material can undergo certain reaction and hence shrinkage. Even if shrinkage of the partition material occurs, blood leakage between the caps and the housing is prohibited because the outside elastomeric ring is kept in sealing contact with the end face of the housing.

Japanese Patent Application No. 135227/1994 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A hollow filament blood processing apparatus comprising a housing having opposite open ends, a bundle of multiple hollow filaments for processing blood, the hollow filament bundle being located in the housing, an inlet and an outlet disposed in the housing near the opposite ends for passing a blood-processing fluid through the housing, partitions fixedly securing the hollow filament bundle at opposite ends to the opposite of the housing, and caps fixedly attached to the opposite ends of the housing to face the respective partitions and each having a port for passing blood from one port to the other port through the hollow filaments, each of said caps having received therein a respective elastomeric annular gasket which is deformable under pressure, each annular gasket including an inside elastomeric ring, an outside elastomeric ring, and an elastomeric annular bridge connecting said inside and outside elastomeric rings, said inside elastomeric ring, said outside elastomeric ring and said annular bridge defining and annular space with a respective partition, each inside elastomeric ring interposed between the respective cap and one of the partitions, said outside elastomeric ring being interposed between the respective cap and the housing.

2. The apparatus of claim 1, wherein said inside elastomeric ring, said annular bridge and said outside elastomeric ring are integrally molded to form said elastomeric annular gasket.

3. The apparatus of claim 2 wherein said inside elastomeric ring has a root portion received in an annular recess in the inner surface of the cap and a seal portion in contact with the partition, and said outside elastomeric ring has a base portion in contact with the inner surface of the cap and a seal portion in contact with the end face of the housing.

\* \* \* \* \*